US011442708B2

(12) United States Patent
Zhang et al.

(10) Patent No.: US 11,442,708 B2
(45) Date of Patent: Sep. 13, 2022

(54) COMPILER-GENERATED ALTERNATE MEMORY-MAPPED DATA ACCESS OPERATIONS

(71) Applicant: Cisco Technology, Inc., San Jose, CA (US)

(72) Inventors: Zhijian Zhang, Ottawa (CA); Avaneesh Anandrao Kadam, San Jose, CA (US); Pratap Pereira, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 79 days.

(21) Appl. No.: 17/024,521

(22) Filed: Sep. 17, 2020

(65) Prior Publication Data
US 2022/0083319 A1    Mar. 17, 2022

(51) Int. Cl.
*G06F 8/41*    (2018.01)
*G06F 12/02*   (2006.01)

(52) U.S. Cl.
CPC .......... *G06F 8/41* (2013.01); *G06F 12/0223* (2013.01); *G06F 2212/163* (2013.01)

(58) Field of Classification Search
CPC ... G06F 8/41; G06F 12/0223; G06F 2212/163
USPC .................................................. 717/136–151
See application file for complete search history.

(56) References Cited

U.S. PATENT DOCUMENTS 5,590,331 A * 12/1996 Lewis ...................... G06F 8/48
                                                    717/114
5,970,490 A   10/1999 Morgenstern
6,151,618 A * 11/2000 Wahbe ................ G06F 11/3624
                                                   714/E11.211
(Continued)

FOREIGN PATENT DOCUMENTS

CN        102982075 B    10/2016

OTHER PUBLICATIONS

Maruyama et al, "A CASE Tool Platform Using an XML Representation of Java Source Code", IEEE, pp. 1-10 (Year: 2004).*
(Continued)

*Primary Examiner* — Anil Khatri
(74) *Attorney, Agent, or Firm* — Lee & Hayes, P.C.

(57) ABSTRACT

Techniques for compiling source code include generating object code by processing source code corresponding to a portion of a software program. The source code includes an instruction, native to a program language, for a memory location access. Based at least in part on processing the source code, the compiler generates second object code that, when executed by one or more processors, configures the one or more processors to determine to implement the memory location access using first database access transaction operations or to implement the memory location access using second database access transaction operations. The compiler may generate third object code that configures the one or more processors to implement the memory location access using the first database access transaction operations (Continued)

or to implement the memory location access using the second database access transaction operations, based at least in part based on the determining.

18 Claims, 10 Drawing Sheets

(56) References Cited

U.S. PATENT DOCUMENTS

| | | | | |
|---|---|---|---|---|
| 6,173,441 | B1* | 1/2001 | Klein | G06F 8/41 |
| | | | | 704/9 |
| 6,397,379 | B1* | 5/2002 | Yates, Jr. | G06F 9/45554 |
| | | | | 717/140 |
| 6,442,663 | B1* | 8/2002 | Sun | G06F 9/54 |
| | | | | 711/202 |
| 6,453,465 | B1* | 9/2002 | Klein | G06F 8/36 |
| | | | | 706/50 |
| 6,658,421 | B1* | 12/2003 | Seshadri | G06F 9/4488 |
| | | | | 707/999.1 |
| 6,772,413 | B2* | 8/2004 | Kuznetsov | G06F 8/51 |
| | | | | 715/236 |
| 6,928,640 | B2* | 8/2005 | Schlussman | G06F 8/30 |
| | | | | 717/137 |
| 6,961,930 | B1* | 11/2005 | Waldspurger | G06F 11/3419 |
| | | | | 717/131 |
| 7,665,077 | B2* | 2/2010 | Mariani | G06F 9/44563 |
| | | | | 717/148 |
| 8,997,070 | B2 | 3/2015 | Klemenz et al. | |
| 9,098,201 | B2* | 8/2015 | Benjamin | G06F 3/067 |
| 9,612,937 | B2 | 4/2017 | Smith et al. | |
| 10,127,041 | B2* | 11/2018 | Henry | G06F 9/3016 |
| 10,209,962 | B2* | 2/2019 | Mishra | G06F 8/41 |
| 10,223,141 | B2 | 3/2019 | Mars et al. | |
| 10,628,438 | B2 | 4/2020 | Waas et al. | |
| 10,649,744 | B1 | 5/2020 | Black et al. | |
| 2008/0127116 | A1 | 5/2008 | Kosche et al. | |
| 2011/0173594 | A1 | 7/2011 | Bartolomeo et al. | |
| 2017/0308457 | A1 | 10/2017 | Barsness et al. | |
| 2018/0225096 | A1 | 8/2018 | Mishra et al. | |
| 2018/0232297 | A1 | 8/2018 | Fan et al. | |
| 2019/0303270 | A1 | 10/2019 | Hoermann | |
| 2020/0272438 | A1 | 8/2020 | Klemenz et al. | |
| 2021/0007309 | A1 | 1/2021 | Shoham et al. | |
| 2021/0042141 | A1 | 2/2021 | De Marco et al. | |
| 2021/0286601 | A1 | 9/2021 | Fitzsimons et al. | |

OTHER PUBLICATIONS

Santhanam, "The Anatomy of an FAA-Qualifiable Ada Subset Compiler", ACM, 40-43 (Year: 2002).*
Colby et al, "A Certifying Compiler for Java", ACM, 95-107 (Year: 2000).*
Davidson et al, "Code Selection through Object Code Optimization", ACM, pp. 505-526 (Year: 1984).*
Naik et al, "Compiling with Code-Size Constraints", ACM, pp. 120-129 (Year: 2002).*
Dyer et al, "Nu: Preserving Design Modularity in Object Code", ACM, pp. 1-2 (Year: 2006).*
Chen et al, "An Empirical Study on the Practice of Maintaining Object-Relational Mapping Code in Java Systems", IEEE, pp. 165-176 (Year: 2016).*
Byun et al, "Toward Rigorous Object-Code Coverage Criteria", IEEE, pp. 328-338 (Year: 2017).*
Office Action for US Patent Application, dated Nov. 4, 2021, Pereira, "Source Code Analysis to Map Analysis Perspectives to Events", 32 Pages.
Office Action for U.S. Appl. No. 17/001,518 dated Apr. 29, 2021, Pereira, "Source Code Analysis to Map Analysis Perspectives to Events" 18 pages.

* cited by examiner

COMPILER-GENERATED ALTERNATE MEMORY-MAPPED DATA ACCESS OPERATIONS

TECHNICAL FIELD

The present disclosure relates generally to compilers and, more specifically, to a compiler that automatically ensures data access operations are appropriate for a particular run-time environment.

BACKGROUND

A database transaction may be a unit of work performed within a database management system, during access to the database. A transaction may include multiple operations that are treated as a coherent unit. For example, a transaction may keep a database consistent even in cases of system failure and allow for proper recovery from such failures. As another example, a transaction may provide coordination among programs accessing a database concurrently, to minimize ambiguous outcomes.

Transactions on a particular first type of database may utilize operations that are appropriate for that type of database. Transactions on a particular second type of database may utilize different and/or additional operations that are appropriate for that type of database. For example, operations appropriate for a first type of database may include generating an undo log during a write access, so that the corresponding database transaction may be rolled back if it is aborted before completing. The operations may also include deleting the undo log once the database access is completed. As another example, a second type of database may allow concurrent access by two (or more) threads of one or more executing programs or processes, and the operations appropriate to the second type of database may ensure consistency such that each program or process sees a consistent view of data, including visible changes made as a result of transactions by the program or process and as a result of transactions by other programs or processes. To provide consistent transaction behavior, the second type of database may be accessed using operations consistent with appropriate transaction isolation models.

It may be useful to standardize source code level data access in a manner that, for a programmer, is agnostic to different data access methodologies and further, may provide database and other data access read/write semantics corresponding to program level instructions, with minimal programmer effort.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
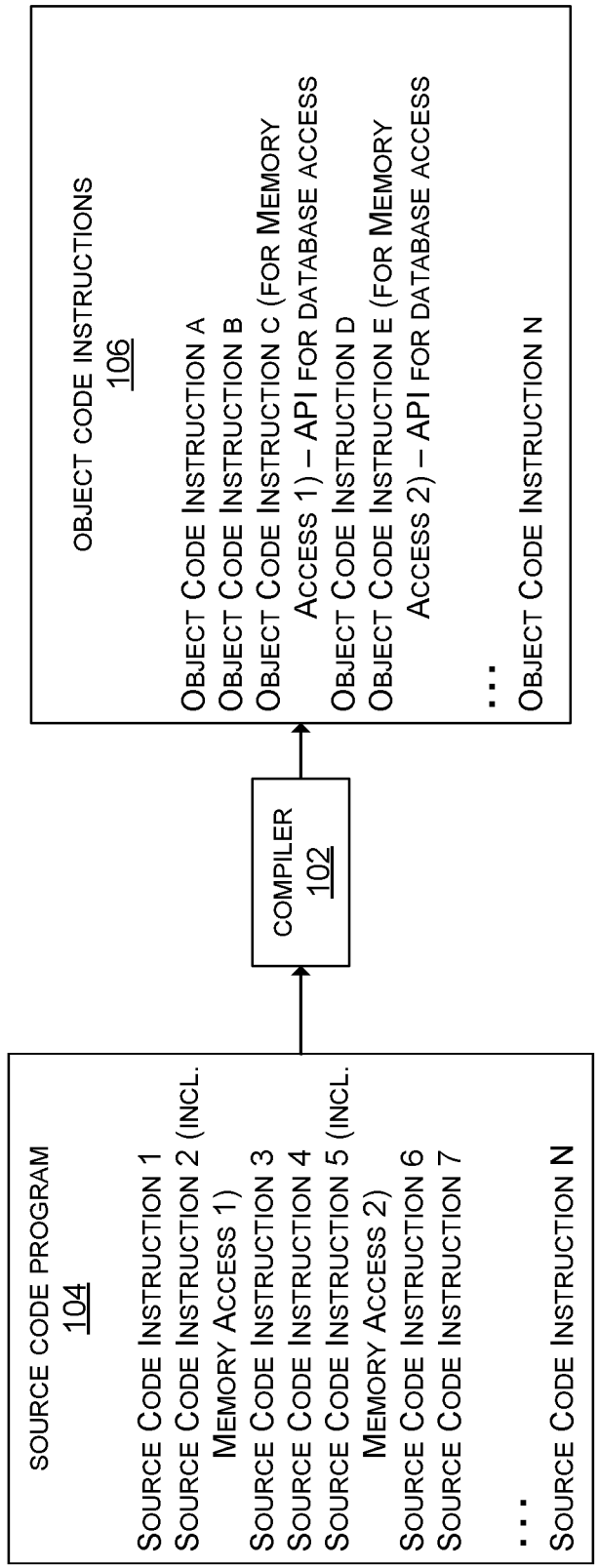
FIG. 1 is a diagram illustrating how a compiler may process a source code program to generate object code instructions that, when executed by one or more processors, cause the one or more processors to determine to implement a memory location access using first database access transaction operations or second database access transaction operations.

This disclosure describes techniques for compiling source code. First object code is generated by processing the source code corresponding to a portion of a software program. The source code includes an instruction, native to a program language, for a memory location access. Based at least in part on processing the source code, second object code is generated. The second object code when executed by one or more processors, configures the one or more processors to determine to implement the memory location access using first database access transaction operations or to implement the memory location access using second database access transaction operations.

The disclosure also describes techniques for one or more processors to execute a program that includes an access to a memory location. The one or more processors determine a database type corresponding to the memory location. Based at least in part on the determining, the one or more processors decide to implement an access to the memory location using first database access transaction operations or to implement the access to the memory location using second database access transaction operations.

Additionally, the techniques described herein may be performed by a system and/or device having non-transitory computer-readable media storing computer-executable instructions that, when executed by one or more processors, performs the methods described herein.

EXAMPLE EMBODIMENTS

It may be useful to standardize source code level data access in a manner that, for a programmer, is agnostic to different data access methodologies and further, may provide data access read/write semantics corresponding to program level instructions, with minimal programmer effort. For example, the underlying data storage may be persistent storage organized as a database.

For example, for network routers and other types of network devices, much of the operation of the device is dependent on routing tables and/or other types of tables that are populated and accessed during a routing process. The underlying data storage methodology may be different for different end users. Furthermore, it may be useful to use new underlying data storage methodologies as new methodologies are developed.

However, for example, utilizing different data storage methodologies for different customers may require maintaining different code bases for different customers. A code base for networking may include multiple millions of lines of source code. Furthermore, migrating to a different data storage methodology may require porting the multiple millions of lines of source code base to utilize the different data storage methodology. Maintaining multiple very large code bases and porting a very large code base can be a vast undertaking.

One example technique to standardize database accesses is known as Open Database Connectivity (ODBC). ODBC provides a standard source-code level application programming interface (API) for querying an ODBC-compliant database management systems (DBMS) across different database platforms. For example, a programmer using the C programming language may write a source code instruction to explicitly access the API. A program written using ODBC APIs, when executed, utilizes an ODBC runtime driver as a translation layer between the application and the DBMS for database queries. The driver passes database queries from the application to the DBMS. When porting an ODBC-compliant application to a different ODBC-compliant database platform, the application source code does not need to be changed. Rather, a runtime driver appropriate to the different ODBC-compliant database platform is provided, and the ODBC-compliant application code can, without recompilation, perform data access to the different ODBC-compliant database platform using the driver appropriate to that different database platform. The ODBC technique is limited to accesses to ODBC-compliant databases and requires programmer compliance, in the source code, with the standard API format.

It may be advantageous to allow a programmer of source code to utilize data access instructions that are native to the source code, such as memory access instructions. Furthermore, it may be advantageous for a compiler to be aware of and account for the underlying data storage methodology for the data being accessed, and to conceal this information from the programmer.

For example, the compiler may process source code including an instruction that includes a memory location access, native to the source code programming language, by generating first object code. Further based at least in part on processing the source code, the compiler may generate second object code, which is part of an underlying API for database access. The second object code, when executed by one or more processors, configures one or more processors to determine to implement the memory location access using first database access transaction operations or to implement the memory location access using second database access transaction operations. The compiler may also generate third object code that is also part of the underlying API. When executed by the one or more processors, the third object code configures the one or more processors to implement the memory location access using the first database access transaction operations or to implement the memory location access using the second database access transaction operations, based at least in part based on the determining.

Thus, for example, a programmer may not even be aware that a memory access in a source code instruction is actually implemented as a database access in a runtime environment in which object code corresponding to the source code instruction is executed. Furthermore, the programmer may not even be aware of what database access transaction operations are appropriate to utilize for the particular database access. In addition, in some examples, even if a database "behind" a particular memory access in a source code instruction changes from a first database to a second database, not only may the source code program not need be modified to accommodate the change, the source code program may not even need to be recompiled.

For example, memory regions of a memory address space may be mapped to different databases. That is, for a memory access to a memory location in a source code instruction, the memory access may be mapped, during execution of object code generated by a compiler processing the source code instruction, to a database that corresponds to the memory location in the source code instruction. Each database may utilize access operations that are appropriate for the particular type of database. For example, single code logic of an underlying API that the compiler includes in the object code may include database access instructions appropriate to access the first database as well as including database access instructions appropriate to access the second database.

For example, database access instructions may be different for different databases, including to accomplish:

mirroring—for accessing a mirrored database, an accessing device may maintain the name of a primary database server as well as the name of a failover database server. The database access instructions may include communicating with the primary database server or the failover database server according to a particular protocol.

redundancy—for accessing certain data that is stored in multiple places in a database, a change or modification to such redundant data requires changing multiple fields of a database. The database access instructions may include a procedure for changing the multiple fields of a database in this situation.

position-independence—in typical memory mapped accesses to regions of memory, the objects stored inside the regions may have pointers that are fixed values that depend on the memory mapping being fixed. The database access instructions may include a procedure to automatically fix up the address relative to the base address of the specific database region.

In other examples, at least some memory regions may be mapped to different physical memories, input/output devices and/or other types of data storage that each may have different access characteristics. While conforming to some of the access characteristics may be handled in hardware, conforming to others of the access characteristics may be handled by the object code of an executing program. The one or more processors accessing memory locations in the memory regions may utilize the underlying API, which will ensure that the one or more processors utilize appropriate access procedures. That is, for example, the underlying API provides a single code path for the memory access instruction, and the underlying API determines which access characteristics to utilize based, for example, on how a memory region being accessed is mapped to a physical memory or input/output device.

As an optimization, it may be desirable to provide the underlying API only for memory access instructions that are demarcated or annotated by a programmer. In practice, it may be the data that the programmer annotates, as opposed to the programmer annotating instructions. For example, a type definition for particular data may indicate that the data is to be accessed via the single code logic API. The programmer does not necessarily need to know the logic within the API or even of the existence of the API, including what access procedures the compiler may generate in the object code corresponding to memory accesses to that data. Based upon the presence of the indication for a particular data type, the compiler may generate the API for all memory accesses to the data having that data type. The compiler may omit to generate the API for accesses to memory for data not having a demarcated or annotated data type. In this way, the compiler may generate the API only for selected memory accesses.

Databases that operate directly in the processing context of the application code may be a form of high performance in-memory databases. Operations on the database may be direct memory operations that have classical database style transactional ACID (atomicity, consistency, isolation and durability) characteristics. It is in this context that memory mapped operations may have special characteristics and properties to be applied to the access and update operations. Alternative set of memory access properties may be utilized to support high concurrency software transactional memory semantics. A challenge using such databases may be compounded when the underlying database runtime that a specific region of memory represents is such that code should behave differently depending on the memory region.

The techniques described herein may be performed by a system and/or device having non-transitory computer-readable media storing computer-executable instructions that, when executed by one or more processors, performs the methods described herein.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 is a diagram illustrating how a compiler 102 may process a source code program 104 to generate object code instructions 106. The object code instructions 106 include object code instructions that, when executed by one or more processors, cause the one or more processors to determine to implement a memory location access using first database access transaction operations or to implement the memory location access using second database access transaction operations.

More particularly, the source code program 104 includes a plurality of source code instructions Source Code Instruction 1, Source Code Instruction 2, and so on to Source Code Instruction N. Two of the source code instructions in the source code program 104 include memory accesses. Source Code Instruction 2 includes Memory Access 1, and Source Code Instruction 5 includes Memory Access 2. For example, the memory accesses may be read or write instructions from or to a memory location, respectively.

Source Code Instruction 2 and Source Code instruction 5 may be standard source code instructions of a standard source-code level computer programming language, such as the C programming language. C program instructions are described, for example, in International Standards Organization ISO/IEC 9899:2018, entitled "Information technology—Programming languages—C." For example, in the C programming language, Source Code Instruction 2 and Source Code Instruction 5 may be "a=b+c" (which includes at least a memory access to a memory location for each of "a," "b" and "c") or "d++" (which includes at least a memory access to a memory location for "d"). These are just two examples, and there are many other examples.

The object code instructions 106 include a plurality of object code instructions Object Code Instruction a, Object Code Instruction b, and so on to Object Code Instruction n. Two of the object code instructions, Object Code Instruction c and Object Code Instruction e correspond to memory accesses included in the source code instructions of the source code program 104. Each of the object code instructions that correspond to memory accesses included in the source code program 104—Object Code Instruction c for Memory Access 1 and Object Code Instruction e for Memory Access 2—include an API for database access. In many examples, after compilation by the compiler 102, there are many more object code instructions 106 than there are instructions in the source code program 104 to which the object code instructions correspond.

The API for database access may include single code logic that can be utilized by object code instructions 106 corresponding to multiple memory accesses included in the source code program 104. The single code logic many itself include multiple object code instructions. For example, Object Code c and Object Code e may each include multiple object code instructions, including object code instructions of the single code logic of the API for database access. The single code logic may be utilized for each of the multiple memory accesses, even where the multiple memory accesses are to utilize different data access transaction instructions, such as different database access transaction operations.

Thus, for example, a programmer may not even be aware that a memory access in a source code instruction is actually implemented as a database access in a runtime environment in which object code corresponding to the source code instruction is executed. Furthermore, the programmer may not even be aware of what database access transaction operations are appropriate to utilize for a particular database access. In addition, in some examples, even if a database "behind" a particular memory access in a source code instruction changes from a first database to a second database, not only may the source code program 104 not need be modified to accommodate the change, the source code program 104 may not even need to be recompiled. For example, the single code logic may include database access instructions appropriate to access the first database as well as including database access instructions appropriate to access the second database. In some examples, the single code logic may be linked after compile, so that it can be modified without recompiling the source code program, to support a new type of access model.

Figure 2:
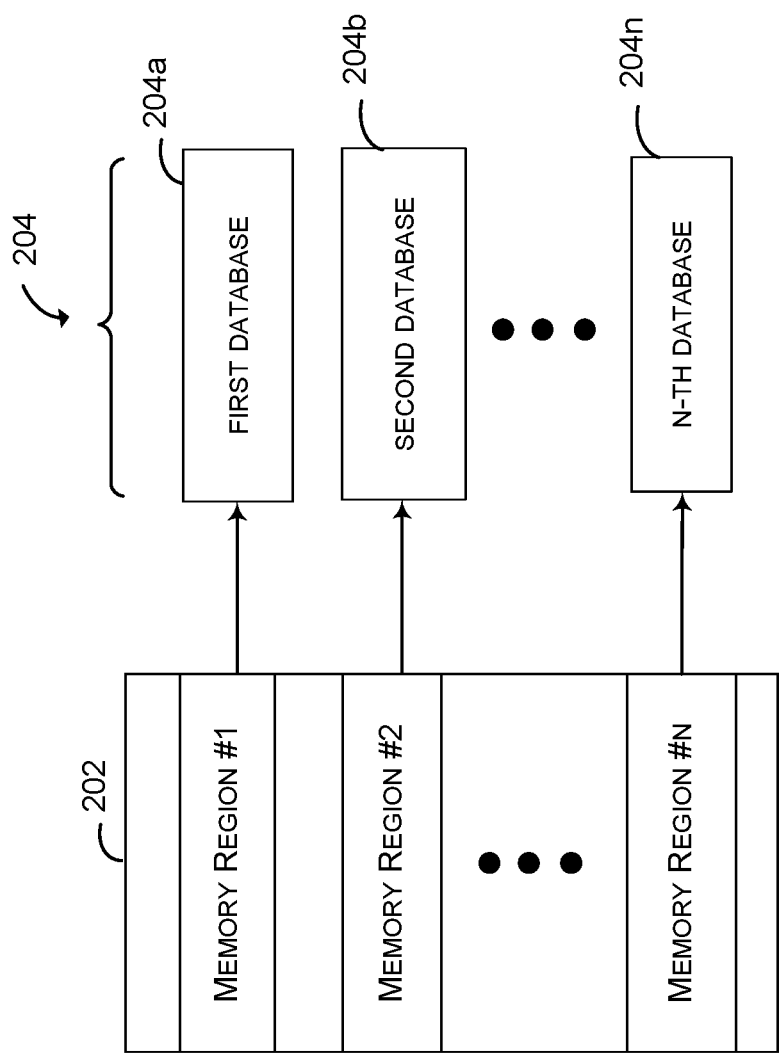
FIG. 2 illustrates how memory regions of a memory are mapped to different databases.

FIG. 2 illustrates an example of how memory regions 202 of a memory address space are mapped to different databases, which may be collectively referred to herein by reference numeral 204. That is, for a memory access to a memory location in a source code instruction, the memory access is mapped, during execution of object code generated by a compiler processing the source code instruction, to a database that corresponds to the memory location in the source code instruction. In FIG. 2, Memory Region #1 is mapped to a first database 204a; Memory Region #2 is mapped to a second database 204b, and so on to Memory Region #n, which is mapped to a n-th database 204n. Each of the first database 204a, the second database 204b and so on to the n-th database 204n may be of various types, and each of the first database 204a, the second database 204b and so on to the n-th database 204n may utilize access operations that are appropriate for the particular type of database. As an example, operations appropriate for the first database 204a may include generating an undo log during a write access, so that the corresponding database transaction may be rolled back if it is aborted before completing. The operations appropriate for the first database 204a may also include deleting the undo log once the database access is completed. As another example, operations appropriate for the second database 204b may allow concurrent access by two (or more) threads of one or more executing programs or processes, and the operations appropriate to the second database 204b may ensure consistency such that each program or process sees a consistent view of data, including visible changes made as a result of transactions by the program or process and as a result of transactions by other programs or processes. To provide consistent transaction behavior, the second database 204b may be accessed using operations consistent with appropriate transaction isolation models. These are examples, and there may be other types of operations appropriate for a particular type of database, including even for some types of databases that are yet to be developed A different database may allow access to a file or device directly as memory operations by implementing the accesses to memory as access to the file or device at different offsets. This may allow mapping of very large databases which exceed the virtual address space.

Figure 3:
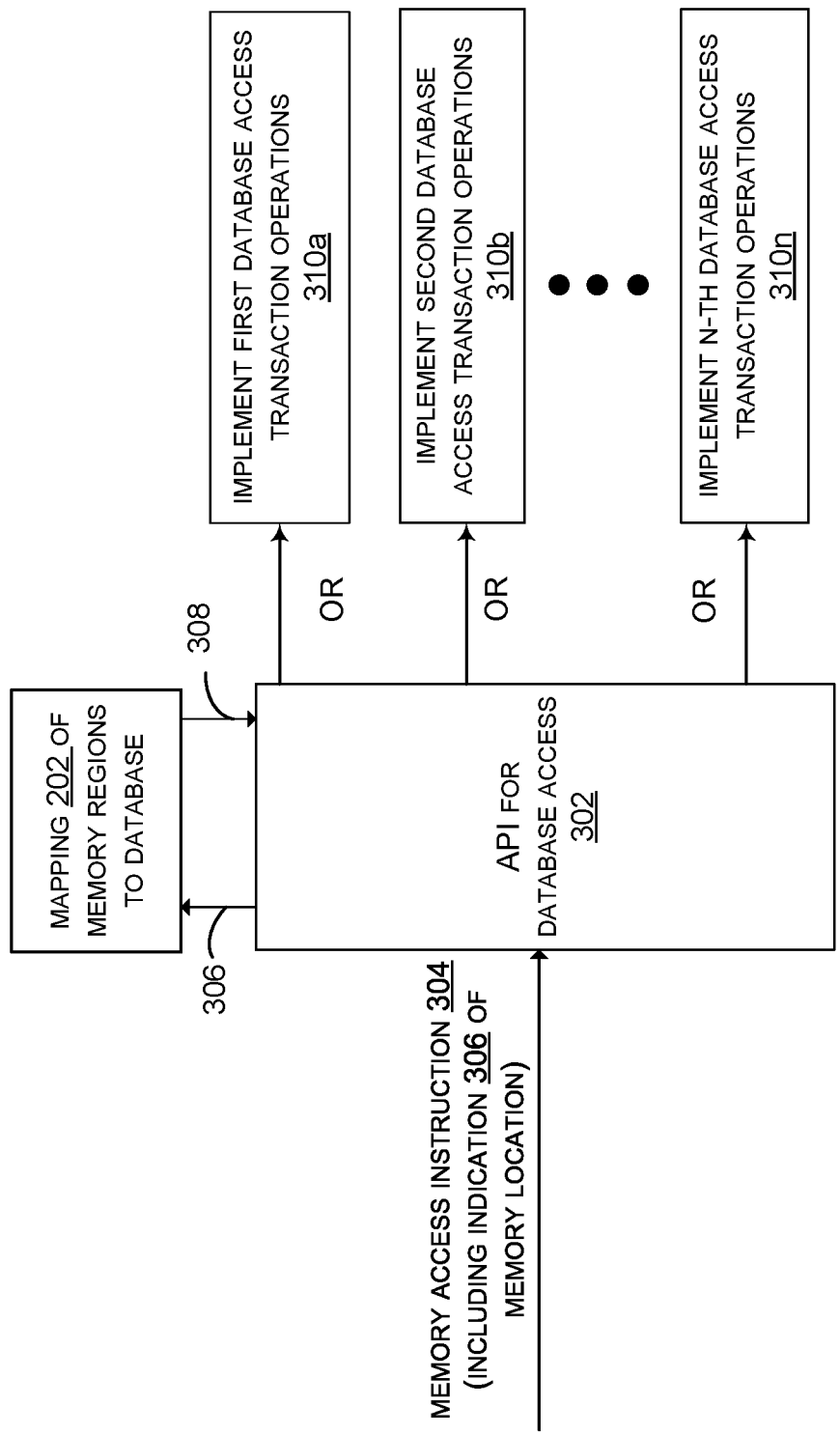
FIG. 3 illustrates input that single code logic included in an API for database access may utilize to determine which database access instructions to utilize for particular object code.

FIG. 3 illustrates an example of input that single code logic included in the API for database access 302 may utilize to determine which database access instructions (e.g., database access transaction instructions appropriate to access a first database, database access transaction instructions appropriate to access a second database, and so on, including database access transaction instructions appropriate to access an n-th database) to utilize for particular object code corresponding to memory accesses included in the source program 104.

As shown in FIG. 3, an object code memory access instruction 304 includes an indication 306 of a memory location to be accessed. Furthermore, the API for database access 302 utilizes the mapping 202 of memory regions to database operations. For example, the API for database access may utilize the indication 306 of the memory location to be accessed as an index into the mapping 202 of memory regions to databases. Based on the indication 306 of the memory location to be accessed, the mapping 202 of memory regions to databases may provide an indication 308 of which database to access that corresponds to the memory location indicated by the indication 306. Based on the indication 308 of which database to access corresponding to the memory location indicated by the indication 306, the API for database access 302 determines which database access instructions to utilize, that is, which of database access transaction instructions 310a appropriate to access the first database 204a, database access transaction instructions 310b appropriate to access the second database 204b, and so on, including database access transaction instructions 302n appropriate to access the n-th database 204n.

Figure 4:
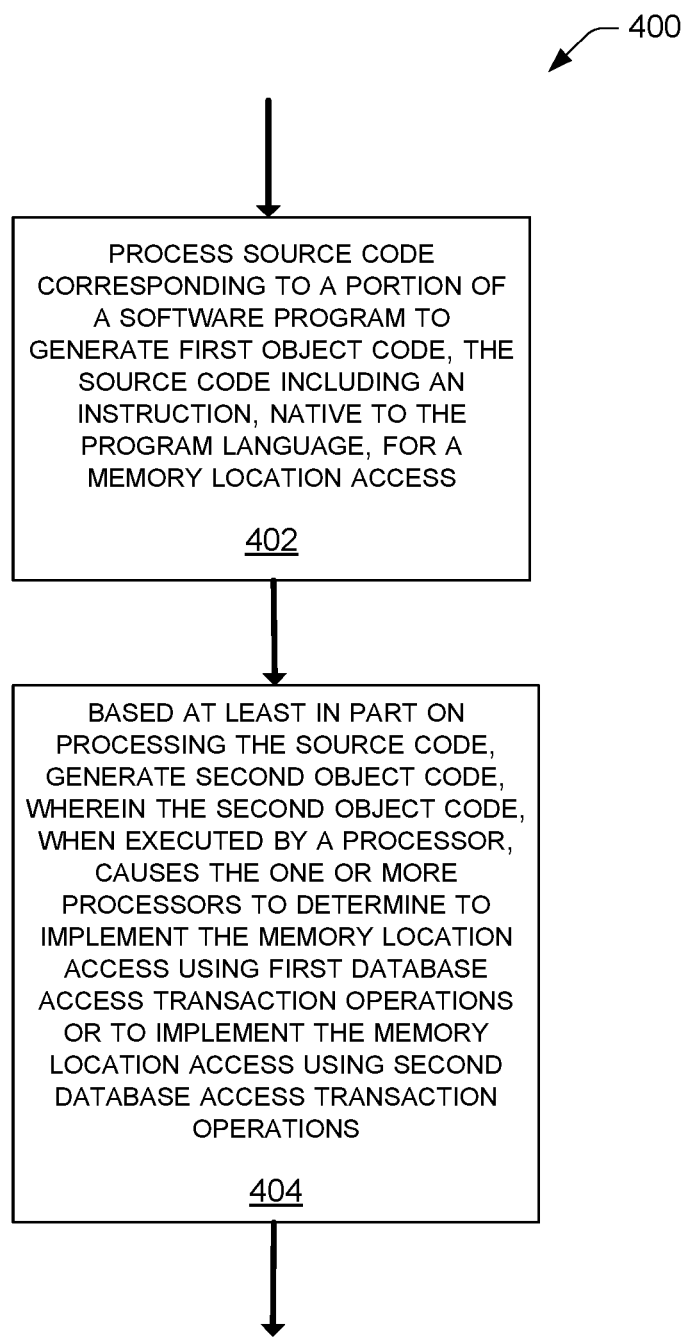
FIG. 4 is a flowchart illustrating an example process by which one or more processors compile an instruction, native to a programming language, that includes a memory location access and generate an API for database access that includes single code logic to determine which database to access to implement the memory location access.

FIG. 4 is a flowchart illustrating an example process 400 by which one or more processors executing the compiler 102 may processes the source code program 104 to generate the object code instructions 106. At 402, the one or more processors generates first object code by processing source code corresponding to a portion of a software program. The source code includes an instruction, native to a programming language, that includes a memory location access. For example, the source code of the portion of the software program may be in the C programming language. The source code instruction may be a C language instruction to perform a read and/or write to a memory location.

The first object code may, for example, be object code corresponding to operations of the source code instruction that do not directly correspond to a memory access. For example, a source code instruction for an addition arithmetic operation may correspond in part to, in object code, an operation to add together two operand values. The operation to add together two operand values may be at least a portion of the operations of the source code instruction, in addition to memory access operations to read and/or write the operand values. The first object code may, as another example, include object code instructions corresponding to accessing second object code.

At 404, the one or more processors generates second object code based at least in part on processing the source code corresponding to the portion of the software program. The second object code, when executed by one or more processors, causes the one or more processors to determine to implement the memory location access using first database access transaction operations or to implement the memory location access using second database access transaction operations. For example, the second object code may correspond to an API for database access. The API for database access may include single code logic that can be utilized by the one or more processors executing the second object code. The single code logic many itself include multiple object code instructions. The single code logic may be invoked for a memory location access, including to determine which database to access to implement the memory location access.

For example, an operation may be to perform the arithmetic operation B=A+1.

In a first example, neither A nor B are in a database. The source code for such an operation may be:

```
void test (int *A, int *B) {
    *B = *A + 1;
}
```

The resulting object code may be:

```
<test>:
    mov    (%rdi),%eax         ; Read A, direct memory access
    add    $0x1,%eax.          ; A + 1
    mov    %eax,(%rsi).        ; Write B, direct memory access
    retq
```

In a second example, A is in a database and B is not in a database. The source code for such an operation may be:

```
void test (int *A __attribute((transaction))__ , int *B) {
    *B = *A + 1;
}
```

The resulting object code may be:

```
<test>:
    callq 7d3e0 <__read32@plt>    ; Read A via API call __read32(A)
    add   $0x1,%eax.               ; A + 1
    mov   %eax,(%rsi).             ; Write B, direct memory access
    retq
```

In a third example, A is not in a database and B is in a database. The source code for such an operation may be:

```
void test (int *A, int *B __attribute((transaction))__) {
    *B = *A + 1;
}
```

The resulting object code may be:

```
<test>:
    mov (%rdi),%eax                ; Read A, direct memory access
    add $0x1,%eax.                 ; A + 1
    callq 7d4e0 <__write32@plt>    ; Write B via API call __write32(B, value)
    retq
```

In a fourth example, both A and B are in a database. The source code for such an operation may be:

```
void test (int *A __attribute((transaction))__,
           int *B __attribute((transaction))__) {
    *B = *A + 1;
}
```

The resulting object code may be:

```
<test>:
    callq 7d3e0 <__read32@plt>     ; Read A via API call __read32(A)
    add   $0x1,%eax.                ; A + 1
    callq 7d4e0 <__write32@plt>     ; Write B via API call __write32(B, value)
    retq
```

Figure 5:
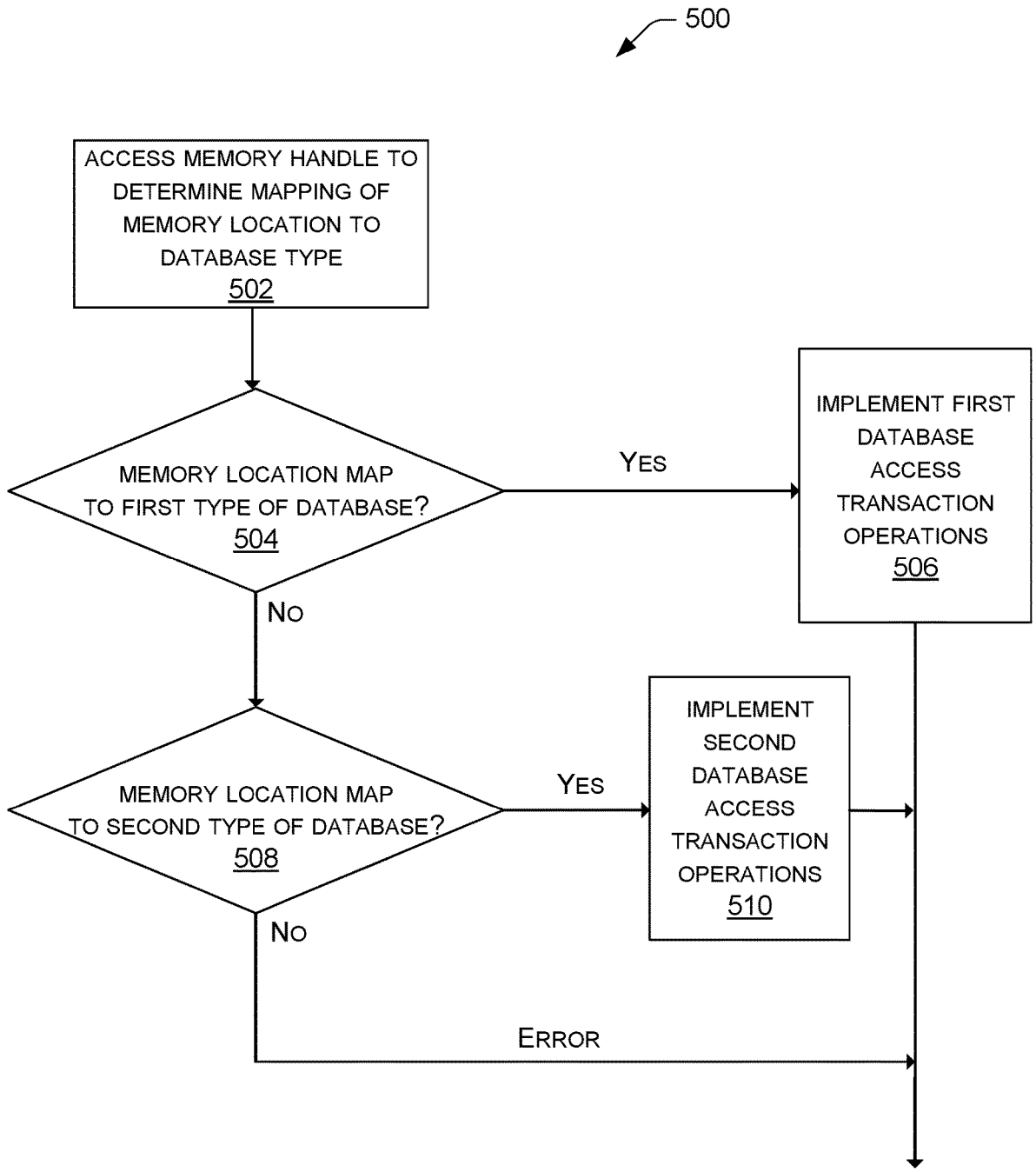
FIG. 5 is a flowchart illustrating an example process that may be performed by one or more processors executing an API that includes single code logic for database access.

FIG. 5 is a flowchart illustrating an example process 500 that may be performed by one or more processors executing the second object code, such as the API including single code logic for database access. The example process 500 can be utilized to access either a first type of database or a second type of database, where there are different database access transactions operations for each type of database. In other examples, a greater number of types of databases than two may be accessed.

At 502, the one or more processors access a database handle which encapsulates access to a memory region. A database handle is a software abstraction that the software developer uses to indicate that they want to access a database. This handle is used to determine a mapping of the to-be accessed memory location to a type of database. For example, the handle may be an abstract reference to an actual database to be used when the application software references a memory region that includes the memory location. The remainder of the process 500 operates at least in part depending on the mapping accessed at 502.

At 504, the one or more processors determines, based on the mapping of memory location to memory type, whether the memory location maps to a first type of database. If yes, then the process 500 continues at 506, where the one or more processors implement first database access transaction operations. The first database access transaction operations are to accomplish a database access corresponding to the memory location access of a source code instruction. The one or more processors perform the first database access transaction operations in a manner that is appropriate for the first type of database. For example, the operations appropriate for the first type of database may include generating an undo log during a write access, so that the corresponding database transaction may be rolled back if it is aborted before completing. The operations appropriate for the first type of database may also include deleting the undo log once the database access is completed.

If, at 504, the one or more processors determines, based on the mapping of memory location to memory type, the memory location does not map to a first type of database, then the process 500 continues at 508. At 508, the one or more processors determines, based on the mapping of memory location to memory type, whether the memory location maps to a second type of database. If yes, then the process 500 continues at 510, where the one or more processors implement second database access transaction operations. The second database access transaction operations are to accomplish a database access corresponding to the memory location access of a source code instruction. The one or more processors perform the second database access transaction operations in a manner that is appropriate for the second type of database. For example, the operations appropriate for the second type of database may allow concurrent access by two (or more) threads of one or more executing programs or processes, and the operations appropriate to the second type of database may ensure consistency such that each program or process sees a consistent view of data, including visible changes made as a result of transactions by the program or process and as a result of transactions by other programs or processes. To provide consistent transaction behavior, the second type of database may be accessed using operations consistent with appropriate transaction isolation models.

If, at 508, the one or more processors determines, based on the mapping of memory location to memory type, the memory location does not map to the second type of database, then an error condition exists, and the one or more processors may perform appropriate error notification and/or resolution procedures.

In other examples, at least some memory regions may be mapped to different physical memories or input/output devices that each may have different access characteristics. While some of the access characteristics may be handled in hardware, some of the access characteristics may be handled in the software of an executing program. For example, some types of memory are physically slow to write, such as some types of Electrically Erasable Programmable Read-Only Memory (EEPROM). Furthermore, some memory, such as some types of EEPROM, may provide an indication of when a write operation is complete, and it may be generally be expected that a program writing to such an EEPROM may poll the indication for write operation completion, prior to advancing beyond the write operation. In some examples, it may be expected that a program writing to such an EEPROM may poll the indication for write operation completion, prior to attempting another write operation. In other examples, a memory region is mapped to an input/output (I/O) device, and the I/O device includes configuration registers that may be written into to control how the I/O device operates. It may be generally expected that a program writing to such an I/O device may write appropriate values into the configuration registers prior to writing values for output to, or reading values for input from, the I/O device. In any case, the single code logic may ensure that one or more processors executing object code to access a memory location in a particular memory region employs appropriate access procedures for the corresponding physical memory and/or I/O device.

In another example, the seamless access to a segmented memory region is facilitated. Normally, segmented access involves setting the segment register and then providing an offset into the specific segment, which is not what a typical memory access mechanism directly provides. This data access may happen implicitly, without the developer explicitly coding this sequence of instructions.

In another example, hardware memory devices may have block allocation and block erase semantics. Details of this data access operation may work from the same source code that is abstracted from a specific access method.

Figure 6:
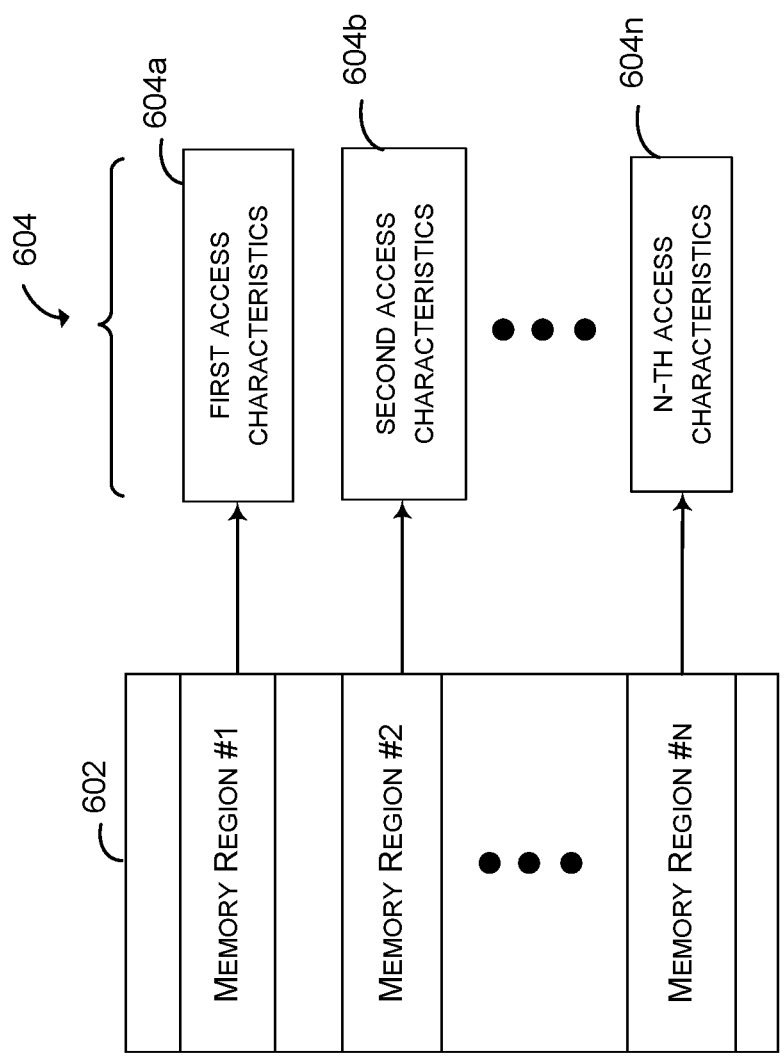
FIG. 6 illustrates how memory regions of a memory are mapped to different access characteristics.

FIG. 6 illustrates how memory regions of a memory 602 are mapped to different access characteristics, which may be collectively referred to herein by reference numeral 604. That is, for a memory access to a memory location in a source code instruction, the memory access is mapped, during execution of object code generated by a compiler processing the source code instruction, to access characteristics that correspond to the memory location in the source code instruction. In FIG. 6, Memory Region #1 is mapped to first access characteristics 604a; Memory Region #2 is mapped to a second access characteristics 604b, and so on to Memory Region #n, which is mapped to n-th access characteristics 604n. Each of the first access characteristics 604a, the second access characteristics 604b and so on to the n-th access characteristics 604n may possibly be different from each other. The access characteristics 604 may be access characteristics appropriate to a particular device, a particular method of accessing a device and/or even a particular type of database.

Figure 7:
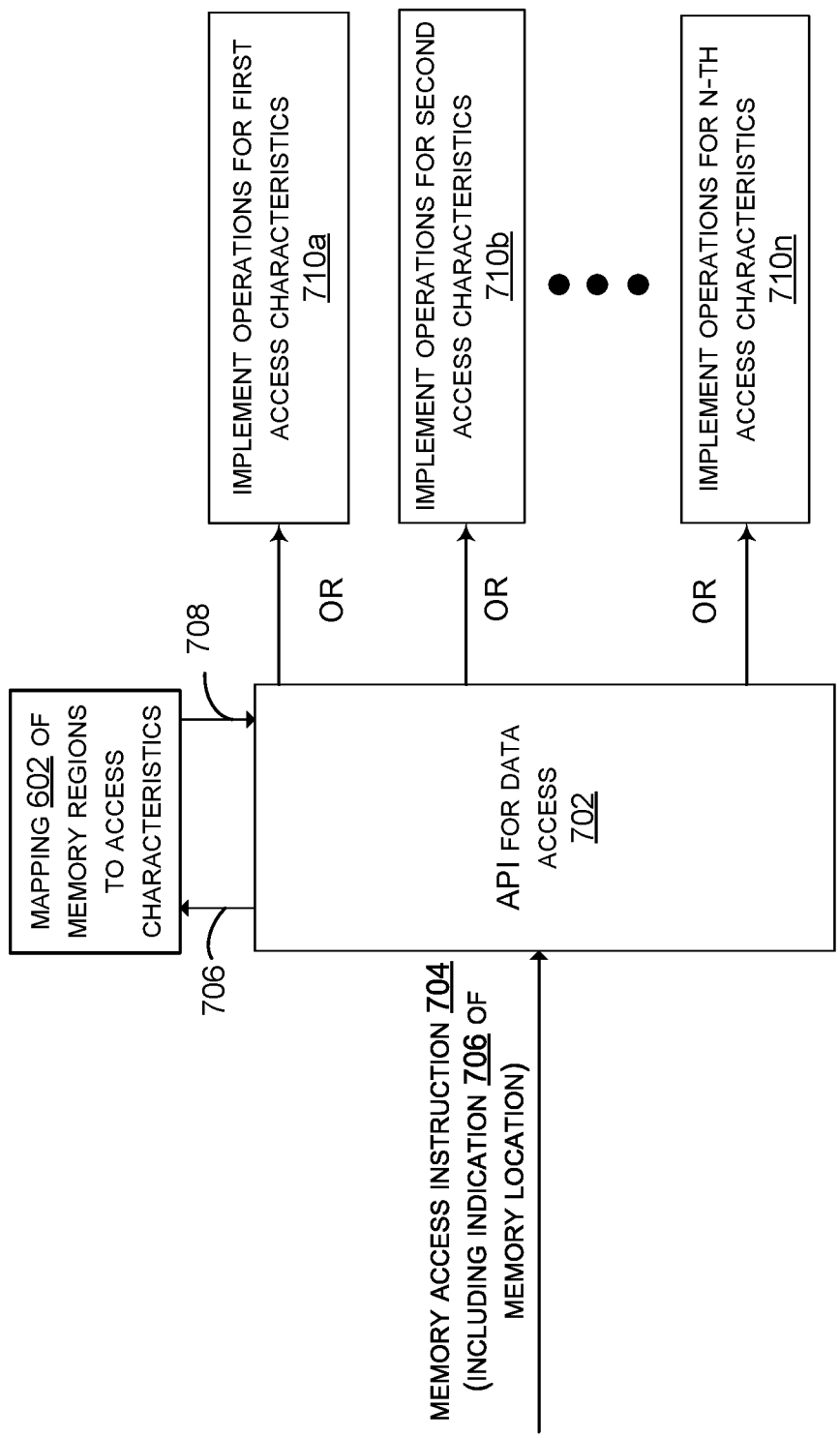
FIG. 7 illustrates input that single code logic included in an API for database access may utilize to determine which database access instructions to utilize for particular object code corresponding to memory accesses included in a source program.

FIG. 7 illustrates input that single code logic included in an API for database access 702 may utilize to determine which access instructions (e.g., access transaction instructions appropriate for first access characteristics, access transaction instructions appropriate for second access characteristics, and so on, including access transaction instructions appropriate for n-th access characteristics) to utilize for particular object code corresponding to memory accesses included in the source program 104.

As shown in FIG. 7, an object code memory access instruction 704 includes an indication 706 of a memory location to be accessed. Furthermore, the API for data access 702 consults the mapping 602 of memory regions to data access characteristics. For example, the API for data access may utilize the indication 706 of the memory location to be accessed as an index into the mapping 602 of memory regions to data access characteristics. Based on the indication 706 of the memory location to be accessed, the mapping 702 of memory regions to data access characteristics may provide an indication 708 of data access characteristics that correspond to the memory location indicated by the indication 706. Based on the indication 708 of data access characteristics to access the memory location indicated by the indication 706, the API for data access 702 determines which access instructions to utilize, that is, which of operations for first data access characteristics 710a, operations for second data access characteristics 710b, and so on, including operations for n-th data access characteristics 702n.

Figure 8:
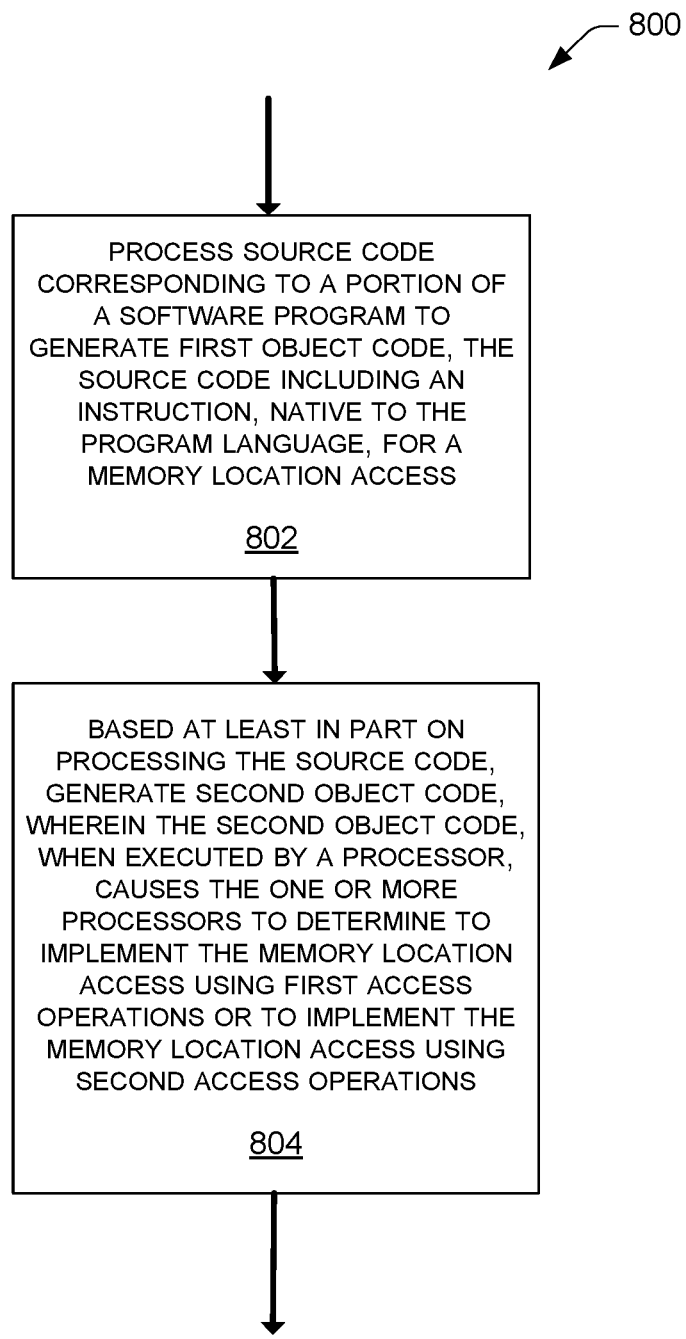
FIG. 8 is a flowchart illustrating an example process by which one or more processors compile an instruction, native to a programming language, that includes a memory location access and generate an API for data access that includes single code logic to determine what operations to utilize to implement the memory location access.

FIG. 8 is a flowchart illustrating an example process 800 by which one or more processors executing a compiler may processes a source code program to generate object code instructions. At 802, the one or more processors generates first object code by processing source code corresponding to a portion of a software program. The source code includes an instruction, native to a programming language, that includes a memory location access. For example, the source code of the portion of the software program may be in the C programming language. The source code instruction may be a C language instruction to perform a read and/or write to a memory location.

The first object code may, for example, be object code corresponding to operations of the source code instruction that do not correspond to a memory access. For example, a source code instruction for an addition arithmetic operation may correspond in part to, in object code, an operation to add together two operand values. The operation to add together two operand values may be at least a portion of the operations of the source code instruction, in addition to memory access operations to read and/or write the operand values. The first object code may, as another example, include object code instructions corresponding to accessing second object code.

At 804, the one or more processors generates second object code based at least in part on processing the source code corresponding to the portion of the software program. The second object code, when executed by one or more processors, causes the one or more processors to determine to implement the memory location access using first access operations or to implement the memory location access using second access operations. For example, the second object code may correspond to an API for memory or database access. The API for may include single code logic that can be utilized by the one or more processors executing the second object code. The single code logic many itself include multiple object code instructions. The single code logic may be invoked for a memory location access, including to determine what access characteristics to utilize to implement the memory location access.

Figure 9:
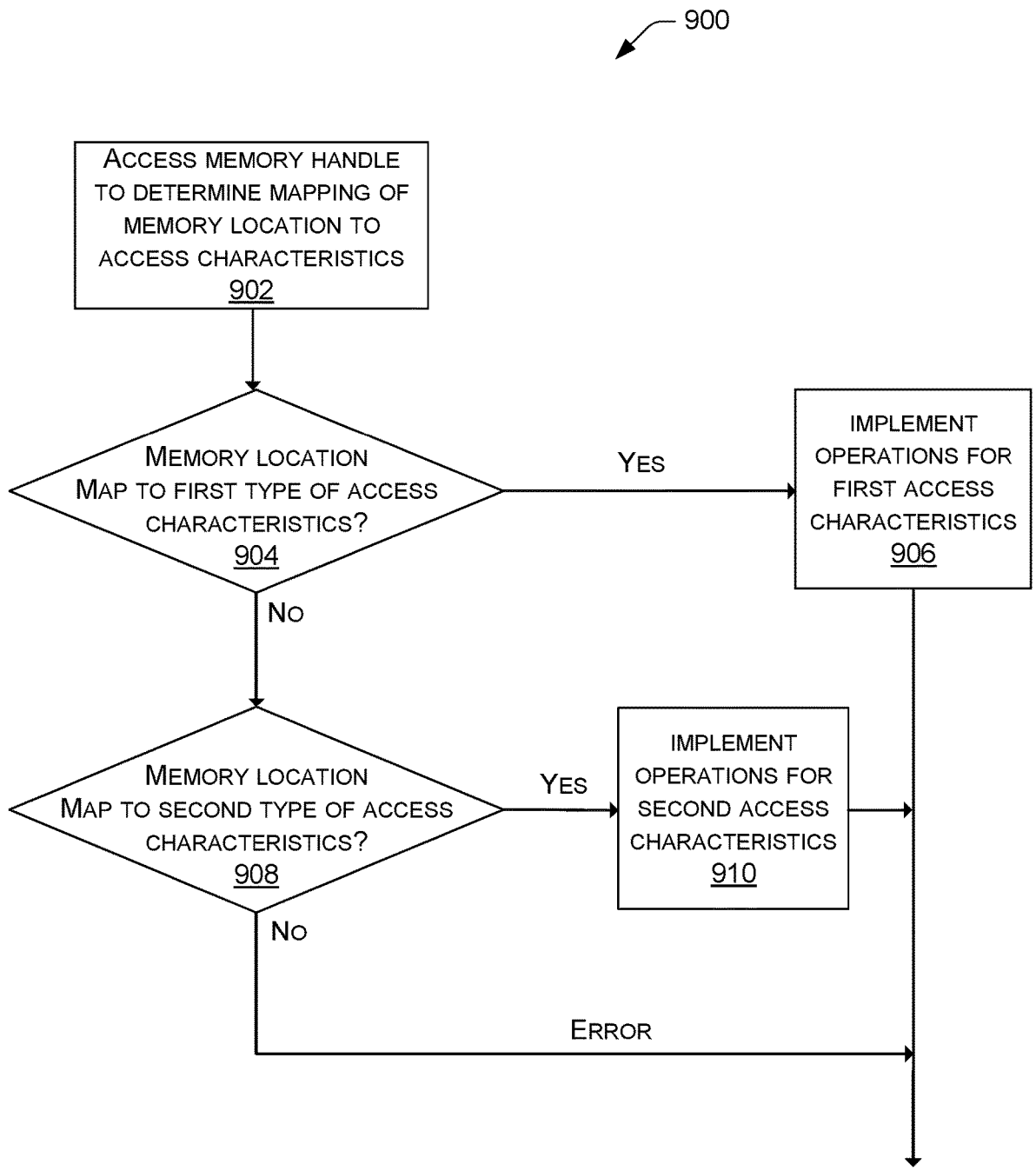
FIG. 9 is a flowchart illustrating an example process that may be performed by one or more processors executing an API including single code logic for data access, to implement either a first type of access or a second type of access.

FIG. 9 is a flowchart illustrating an example process 900 that may be performed by one or more processors executing the second object code, such as the API including single code logic for data access. The example process 900 can be utilized to implement either a first type of access or a second type of access, where there are different access operations for each type of access.

At 902, the one or more processors access a memory handle to determine a mapping of the to-be accessed memory location to access characteristics. For example, the handle may be an abstract reference to access characteristics to be used when the application software references a memory region that includes the memory location. The remainder of the process 500 operates depending on the mapping accessed at 902.

At 904, the one or more processors determines, based on the mapping of memory location to memory type, whether the memory location maps to a first type of access characteristics. If yes, then the process 900 continues at 906, where the one or more processors implement operations for first access characteristics. The operations for first access characteristics are to accomplish an access corresponding to the memory location access of a source code instruction. The one or more processors perform the operations for first access in a manner that is appropriate to the first type of access characteristics.

If, at 904, the one or more processors determines, based on the mapping of memory location to memory type, the memory location does not map to a first type of access characteristics, then the process 900 continues at 908. At 908, the one or more processors determines, based on the mapping of memory location to memory type, whether the memory location maps to a second type of access characteristics. If yes, then the process 900 continues at 910, where the one or more processors implement operations for second access characteristics. The operations for second access characteristics are to accomplish an access corresponding to the memory location access of a source code instruction. The one or more processors perform the operations for second access in a manner that is appropriate to the second type of access characteristics.

For example, the access characteristics may be access characteristics for a database having or characterized by particular access characteristics, a physical memory having or characterized by particular access characteristics, an I/O device having or characterized by particular access characteristics, and/or for memory access mappings having or characterized by particular access characteristics.

If, at 908, the one or more processors determines, based on the mapping of memory location to memory type, the memory location does not map to the second type of access characteristics, then an error condition may exist, and the one or more processors may perform appropriate error notification and/or resolution procedures.

In some examples, a compiler generates an API for data access in source code based at least in part on an indication of a data item for which a source code instruction includes a memory access. For example, a program developer may utilize, in a declaration of the data item, a mechanism that allows the declaration to carry additional data that can be evaluated at compile time. The use of such additional data in the declaration can provide optimize both the compile time and runtime associated with the source code. At compile time, a compiler may be configured to generate an API for accesses of data whose declaration includes an indication. The indication may be, for example, a binary "yes/no" indication, with a "no" indication resulting in an API not generated for accesses to that data. As another example, the indication may be an indication of what are the possible databases and/or access characteristics to which a memory location of the data item may be mapped, resulting in an API generated for access to that data including alternatives to access the data item in the specific possible databases and/or with specific possible access characteristics. For example, the mapping may be the mapping 202 and/or the mapping 602. As a result, the compiler may selectively generate an API and/or may selectively determine the content of the API. At runtime in accordance with the optimization, an API for data access as described herein may be executed fewer times and/or may be more efficiently executed.

Figure 10:
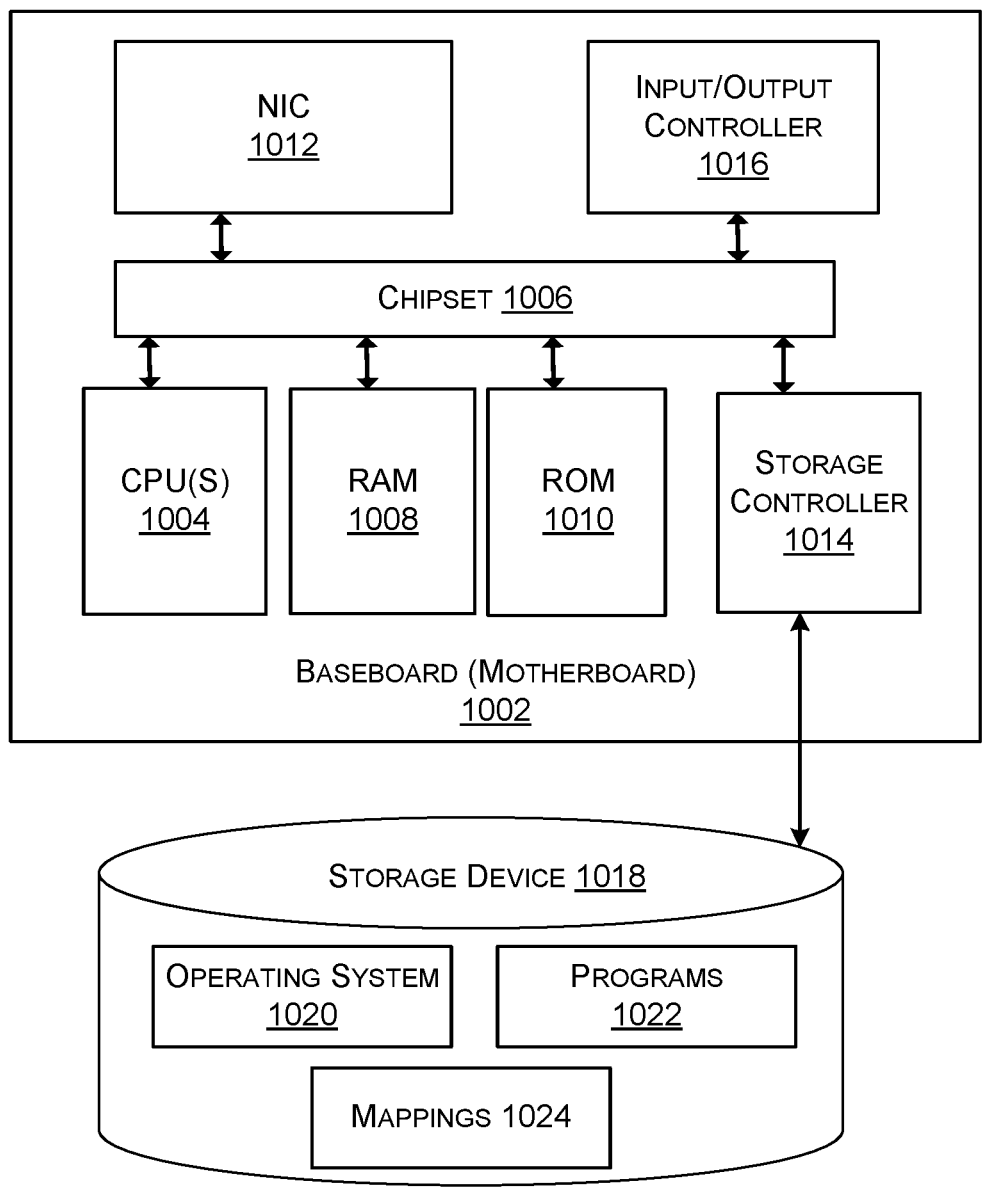
FIG. 10 illustrates an example computer architecture for a computer capable of executing program components for implementing the functionality described herein.

FIG. 10 illustrates an example computer architecture for a computer 1000 capable of executing program components for implementing the functionality described above. The computer architecture shown in FIG. 10 illustrates an architecture of a server computer, workstation, desktop computer, laptop, tablet, network appliance, e-reader, smartphone, network switch, or other computing device, and can be utilized to execute any of the software components presented herein. The computer 1000 may, in some examples, correspond to a network infrastructure device discussed herein.

The computer 1000 includes a baseboard 1002, or "motherboard," which may be a printed circuit board to which a multitude of components or devices can be connected by way of a system bus or other electrical communication paths. In one illustrative configuration, one or more central processing units ("CPUs") 1004 operate in conjunction with a chipset 1006. The CPUs 1004 can be, for example, standard programmable processors that perform arithmetic and logical operations necessary for the operation of the computer 1000.

The CPUs 1004 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1006 provides an interface between the CPUs 1004 and the remainder of the components and devices on the baseboard 1002. The chipset 1006 can provide an interface to a RAM 1008, used as the main memory in the computer 1000. The chipset 1006 can further provide an interface to a computer-readable storage medium such as a read-only memory ("ROM") 1010 or non-volatile RAM ("NVRAM") for storing basic routines that help to startup the computer 1000 and to transfer information between the various components and devices. The ROM 1010 or NVRAM can also store other software components necessary for the operation of the computer 1000 in accordance with the configurations described herein. As illustrated in FIG. 10, the ROM 1010 or NVRAM can also store data usable by the computer 1000 to generate and/or process attestation information in messages exchanged among the computer 1000 and other devices. In other examples, this data may be stored elsewhere, such as in RAM 1008.

The computer 1000 can operate in a networked environment using logical connections to remote computing devices and computer systems through a network. For example, the chipset 1006 can include functionality for providing network connectivity through a Network Interface Controller (NIC) 1012, such as a gigabit Ethernet adapter. The NIC 1012 can connect the computer 1000 to other computing devices over a network. It should be appreciated that multiple NICs 1012 can be present in the computer 1000, connecting the computer to other types of networks and remote computer systems. In some instances, the NICs 1012 may include at least one ingress port and/or at least one egress port. An input/output controller 1016 may be provided for other types of input/output.

The computer 1000 can be connected to a storage device 1018 that provides non-volatile storage for the computer. The storage device 1018 can store an operating system 1020, programs 1022, and data 1024, for example. The storage device 1018 can be connected to the computer 1000 through a storage controller 1014 connected to the chipset 1006. The storage device 1018 can include one or more physical storage units. The storage controller 1014 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units. The data 1024 may include, for example, a mapping of memory regions to types of databases and/or to access characteristics.

The computer 1000 can store data on the storage device 1018 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 1018 is characterized as primary or secondary storage, and the like. For example, the computer 1000 can store information to the storage device 1018 by issuing instructions through the storage controller 1014 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1000 can further read information from the storage device 1018 by detecting the physical states or characteristics of one or more particular locations within the physical storage units.

In addition to the storage device 1018 described above, the computer 1000 can have access to other computer-readable storage media to store and retrieve information, such as program modules, data structures, or other data, including data to generate and/or process attestation information. It should be appreciated by those skilled in the art that computer-readable storage media is any available media that provides for the non-transitory storage of data and that can be accessed by the computer 1000.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative of some embodiments that fall within the scope of the claims of the application.

What is claimed is:

1. A method of compiling source code, comprising:
   generating first object code by processing the source code corresponding to a portion of a software program, the source code including an instruction, native to a program language, for a memory location access;
   based at least in part on processing the source code, generating second object code, the second object code comprising single code logic of an application programming interface associated with database access; and
   wherein the second object code, when executed by one or more processors, configures the one or more processors to determine to implement,
   the memory location access using first database access transaction operations or to implement the memory location access using second database access transaction operations based at least in part on a memory location associated with the memory location access being mapped to a first database or a second database;
   wherein generating the second object code includes processing an annotation associated with the instruction, wherein the annotation at least indicates the compiling is to generate the second object code.

2. The method of claim 1, further comprising:
   generating third object code that, when executed by the one or more processors, configures the one or more processors to implement the memory location access using the first database access transaction operations or to implement the memory location access using the second database access transaction operations, based at least in part based on the determining.

3. The method of claim 1, wherein the second object code, when executed by the one or more processors, configures the one or more processors to process a mapping of memory regions to respective data access characteristics.

4. The method of claim 3, wherein the second object code, when executed by the one or more processors, configures the one or more processors to process an indication of the memory location for the memory location access.

5. The method of claim 1, wherein the second object code, when executed by the one more processors, determines to implement the memory location access using the first database access transaction operations based at least in part on the memory location being in a first memory region that maps to the first database or to implement the memory location access using second database access transaction operations based at least in part on the memory location being in a second memory region that maps to the second database.

6. The method of claim 1, wherein the first database access transaction operations include generating an undo log and the second database access transaction operations include operations to govern concurrent access to the second database.

7. The method of claim 1, wherein the first object code includes at least object code instructions that do not include the memory location access.

8. A method performed by one or more processors executing a program that includes an access to a memory location, the method comprising:
   determining a database type corresponding to the memory location; and based at least in part on the determining, deciding to implement the access to the memory location using first database access transaction operations or to implement the access to the memory location using second database access transaction operations, based at least in part on the access to the memory location being mapped to a first database or a second database;

wherein generating the second object code includes processing an annotation associated with the instruction, wherein the annotation at least indicates the compiling is to generate the second object code.

9. The method of claim 8, wherein:

determining the database type includes processing a handle of the memory location.

10. The method of claim 8, further comprising:

based at least in part on the deciding, accessing the memory location using the first database access transaction operations or using the second database access transaction operations.

11. The method of claim 10, wherein:

the first database access transaction operations include generating an undo log and the second database access transaction operations include operations to govern concurrent access to the second database.

12. One or more non-transitory computer-readable storage media storing computer-readable instructions that, when executed, instruct one or more processors to perform operations for compiling source code, comprising:

generating first object code by processing source code corresponding to a portion of a software program, the source code including an instruction, native to a program language, for a memory location access;

based at least in part on processing the source code, generating second object code; and wherein the second object code, when executed by one or more processors of a target computing system, configures the one or more processors of the target computing system to determine to implement, the memory location access using first database access transaction operations or to implement the memory location access using second database access transaction operations based at least in part on a memory location associated with the memory location access being mapped to a first database or a second database;

wherein generating the second object code includes processing an annotation associated with the instruction, wherein the annotation at least indicates the compiling is to generate the second object code.

13. The one or more non-transitory computer-readable storage media of claim 12, the operations further comprising:

generating third object code that, when executed by the one or more processors, configures the one or more processors of the target computing system to implement the memory location access using the first database access transaction operations or to implement the memory location access using the second database access transaction operations, based at least in part based on the determining.

14. The one or more non-transitory computer-readable storage media of claim 12, wherein the second object code, when executed by the one or more processors of the target computing system, configures the one or more processors of the target computing system to process a mapping of memory regions to respective data access characteristics.

15. The one or more non-transitory computer-readable storage media of claim 14, wherein the second obj ect code, when executed by the one or more processors of the target computing system, configures the one or more processors of the target computing system to process an indication of the memory location for the memory location access.

16. The one or more non-transitory computer-readable storage media of claim 12, wherein the second object code, when executed by the one more processors of the target computing system, determines to implement the memory location access using the first database access transaction operations based at least in part on the memory location being in a first memory region that maps to the first database or to implement the memory location access using second database access transaction operations based at least in part on the memory location being in a second memory region that maps to the second database.

17. The one or more non-transitory computer-readable storage media of claim 12, wherein the first database access transaction operations include generating an undo log and the second database access transaction operations include operations to govern concurrent access to the second database.

18. The one or more non-transitory computer-readable storage media of claim 12, wherein the first object code includes at least object code instructions that do not include the memory location access.

* * * * *